United States Patent [19]

Mishina et al.

[11] Patent Number: 4,735,001
[45] Date of Patent: Apr. 5, 1988

[54] VAPOR REFLOW TYPE SOLDERING APPARATUS

[75] Inventors: Haruo Mishina, Ushiku; Keizo Thuchiya, Niihari, both of Japan

[73] Assignee: Hitachi Techno Engineering Co., Ltd., Tokyo, Japan

[21] Appl. No.: 42,339

[22] Filed: Apr. 24, 1987

[30] Foreign Application Priority Data

Apr. 25, 1986 [JP] Japan .................................. 61-94497
Apr. 25, 1986 [JP] Japan .................................. 61-94498

[51] Int. Cl.⁴ .............................................. F26B 15/04
[52] U.S. Cl. .......................................... 34/73; 34/78; 118/729; 118/61
[58] Field of Search ...................... 34/73, 78; 118/733, 118/58, 729, 61

[56] References Cited

U.S. PATENT DOCUMENTS 4,389,797 6/1983 Spigarelli et al. ...................... 34/78
4,612,712 9/1986 Pescatore et al. ...................... 34/78
4,658,513 4/1987 Strattman .............................. 34/78

Primary Examiner—Larry I. Schwartz
Attorney, Agent, or Firm—Antonelli, Terry & Wands

[57] ABSTRACT

A vapor reflow type soldering apparatus is provided with a vapor generating tank in which liquefied thermal medium is heated to be converted into vapor. An article or part to be processed is delivered through the vapor generating tank by a conveyor, and a soldering material of the article is heated and molten by the vapor of the thermal medium. The soldering apparatus is further provided with at least one unit or system for introducing the liquefied thermal medium into the vapor generating tank. The liquefied thermal medium is delivered through a pipe provided at a position where heat-exchange between the liquefied thermal medium of the pipe and the high temperature thermal medium is possible to be effected. The liquefied thermal medium is introduced into the vapor generating tank after it has been preheated through the heat exchange with the high temperature thermal medium.

20 Claims, 10 Drawing Sheets

VAPOR REFLOW TYPE SOLDERING APPARATUS

BACKGROUND OF THE INVENTION

The present invention relates to a soldering or bonding apparatus, and more particularly to a vapor reflow type soldering apparatus that is suitable for soldering or bonding works of printed circuit boards or articles in which various electronic parts are arranged at a high density.

There are copending U.S. application Ser. Nos. 943,749 and 944,572 filed in the name of H. Mishina et al. on Dec. 19, 1986 and Dec. 22, 1986, respectively, and both relating to the vapor reflow type soldering apparatus.

Recently, there have been remarkably developed a high density arrangement of electronic parts in printed circuit boards, and particularly a high density arrangement of electronic parts such as so-called flat packaged I.C. each having two-dimensional electrode terminals extending in four directions, chip arts of resistors, capacitors and the like. A soldering or brazing work to attaching electronic parts such as I.C. and chips to a printed circuit board is performed in a final step of the manufacture line. For this reason, the performance of the electronic parts largely depends upon a quality of the soldering work. Thus, the soldering technique tends to be regarded as the most important and significant technique among various works in the manufacture line. Recently, a vapor reflow type soldering apparatus has been proposed which employs a vapor having a large specific weight relative to that of air as thermal medium and heats material to be processed by utilizing its condensing latent heat, in view of needs to enhance a uniformity of temperature distribution within a soldering work furnace and to avoid an undesirable excessive heating of the electronic parts.

A basic structure in which thermal medium vapor is utilized for processing is disclosed in U.S. Pat. No. 4,389,797 to Donald J. Spigarelli et al. Also, in Japanese Patent Unexamined Publication No. 106502/1980, there is shown a soldering apparatus provided with a vapor reservoir that is so called vapor reflow tank. In the latter apparatus, a solder is heated and molten by passing a printed circuit board carrying thereon electronic parts through a saturated vapor of the thermal medium within the vapor reservoir, thus performing the soldering work of the electronic parts onto the printed circuit board.

In such a vapor reflow type soldering apparatus, after the parts to be processed have been brought into contact with the thermal medium vapor, the thermal medium vapor is partly condensed to drop down, or in the case where a cooler is disposed in the line, the thermal medium is cooled by the cooler to be liquefied and returned back to the vapor reservoir. Also, the vapor discharged to the path for the parts to be processed is collected by collecting means provided along the path, and is cooled and liquefied in the same manner. In this case, the thermal medium that has passed through the collecting means has a considerably low temperature in comparison with that of the thermal medium within the vapor reservoir, to temporarily decrease the temperature of the medium within the vapor reservoir and to reduce the amount of the generated vapor. This would adversely affect the work efficiency. Also, a fluoric inactive organic agent or the like is used as the thermal medium, and its viscosity at room temperature is ten to fifteen times as high as that of water. For this reason, the fluid resistance of the thermal medium is large, and it takes a long time to return it back to the vapor reservoir. It is therefore necessary to keep a sufficient liquid level of the expensive thermal medium by storing an excess of the thermal medium.

There are the same tendencies also in the case where the thermal medium is replenished from a supply tank or the like, corresponding to the reduction during the process.

SUMMARY OF THE INVENTION

An object of the present invention is to provide a vapor reflow type soldering apparatus which is excellent in working reliability by enhancing temperature condition for liquefied thermal medium to be introduced into a vapor generating tank, thereby preventing the temperature drop in the tank.

Another object of the invention is to provide a vapor reflow type soldering apparatus with a simple structure that is capable of preheating the liquefied thermal medium to be introduced into the vapor tank, thereby enhancing an economic aspect of the apparatus.

According to the present invention, there is provided a vapor reflow type soldering apparatus in which saturated vapor of thermal medium is generated in a vapor generating tank, an article to be processed is delivered through the tank by a conveyor means, a soldering or brazing material on the article is heated and molten by the thermal medium vapor for performing a soldering process, the thermal medium vapor is condensed and collected by a thermal medium collecting means, the liquefied thermal medium is returned back to the vapor generating tank, and a heat exchanger means between the liquefied thermal medium and the high temperature thermal medium is provided between the vapor generating tank and the thermal medium collecting means, thereby preheating the liquefied thermal medium and introducing it into the vapor generating tank.

It is preferable that the heat exchanger means include a pipe arranged so as to be in at least partial contact with the high temperature thermal medium for delivering the liquefied thermal medium to the vapor tank.

According to another aspect of the invention, a replenishment means for replenishing the liquefied thermal medium into the vapor generating tank may be provided, and a second heat exchanger means for preheating the replenishment thermal medium through heat-exchange with the high temperature thermal medium may also be provided between the replenishment means and the vapor generating tank.

These and other objects, features and advantages will become more apparent by the following description of embodiments in conjunction with the accompanying drawings: in which

BRIEF DESCRIPTION OF THE DRAWINGS

The accompanying drawings show vapor reflow type soldering apparatuses according to the embodiments of the invention.

DETAILED DESCRIPTION OF THE PREFERRED EMBODIMENTS

Figure 1:
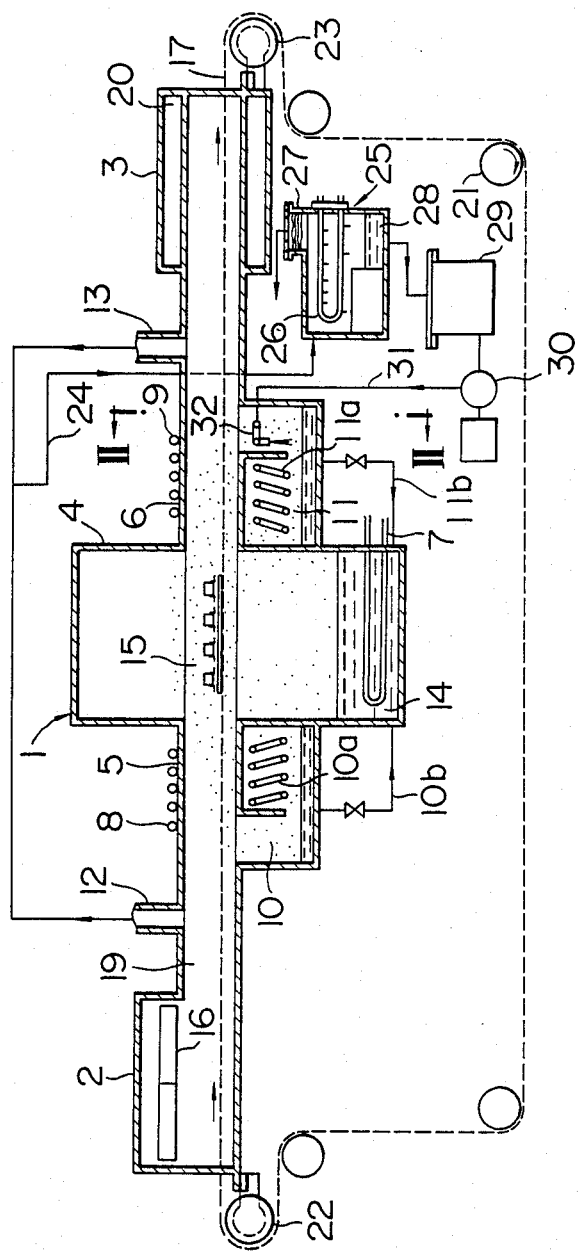
FIG. 1 is a cross-sectional side elevational view showing an overall structure of a first embodiment.

FIG. 1 shows a vapor reflow type soldering apparatus in accordance with a first embodiment of the present invention. The apparatus comprises a reflow chamber 1, a preheating chamber 2 arranged upstream of the reflow chamber 1 and a cooling chamber arranged downstream of the reflow chamber 1. The reflow chamber 1 has a vapor generating tank 4 arranged substantially centrally in the apparatus, and inlet and outlet side passages 5 and 6 arranged upstream and downstream of the reflow chamber 1 (on the left and right sides in FIG. 1). The vapor generating chamber 4 is of a structure for receiving a liquefied thermal medium 14 therein and filling it with a vapor 15. An electric heater 7 is provided in a bottom of the tank 4.

The passages 5 and 6 are connected to the vapor generating tank 4, thereby defining a delivery path 19 extending substantially horizontally through the tank 4. Incidentally, in the vapor generating tank 4, a porous member such as a metal mesh is provided along the delivery path 19 in order to prevent the electronic parts or the like from falling downwardly. The preheating chamber 2 is provided with an electric preheater 16 and is arranged at an inlet end of the delivery path, whereas the cooling chamber 3 is provided with a cooling jacket 20 through which coolant such as water passes and is arranged at an outlet end of the delivery path 19.

Upper cooling coils 8 and 9 through which coolant such as water passes are provided on upper portions of the passages 5 and 6 near the vapor generating tank 4, respectively. Lower cooling chambers 10 and 11 are provided under the passages 5 and 6 corresponding to the upper cooling coils. Each of the lower cooling chambers is in communication with the delivery path and is provided with a cooling coil 10a or 11a. The lower cooling chambers 10 and 11 are constructed so as to receive the condensed thermal medium and are in communication with the bottom of the vapor generating tank 4 through pipes 10b and 11b, respectively.

A conveyor 17 is provided through the delivery path 19. The conveyor 17 is driven by a drive roller 21 and is guided upstream and downstream of the delivery path by inlet and outlet side rollers 22 and 23. A known structure may be applied to the conveyor, but it is preferable to use a mesh-like delivery member or chain members arranged with central space left therebetween so that the thermal medium vapor 15 may be brought into contact with the parts to be processed, such as printed circuit boards carrying thereon electronic parts and the condensed thermal medium may drop through the delivery member.

An inlet side discharge port 12 and an outlet side discharge port 13 are provided in the passages 5 and 6 downstream of the preheating chamber 2 and upstream of the cooling chamber 3, respectively. These discharge ports 12 and 13 are together in communication with the thermal medium collecting system through a pipe 24.

The thermal medium collecting system includes a collecting means 25 and a water/acid remover 29 connected to the collecting means 25. The collecting means 25 incorporates a cooling coil 26 for cooling water or the like and a demister 27, thereby cooling and liquefying the introduced thermal medium vapor. The demister 27 has a mesh member such as overlapped metal meshes and serves to collect the vapor by letting the same contact with the mesh member and condense into liquefied drops of large diameter. Also, the water/acid remover 29 serves to remove water and/or acid mixed in the liquefied thermal medium 28 by, for example, absorbers.

Figure 2:
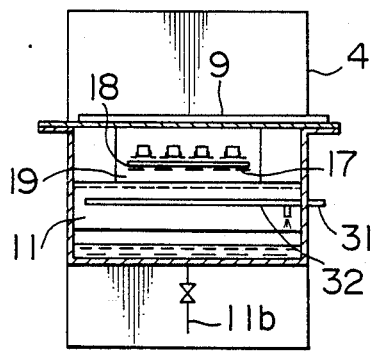
FIG. 2 is a cross-sectional view taken along the line II—II of FIG. 1.

The water/acid remover 29 communicates with the lower cooling chamber 11 on the outlet side through a pump 30 and a pipe 31. The pump 30 is actuated by controlling a level switch (not shown) built in the water/acid remover 29 when a predetermined amount of thermal medium is held in the remover. In the lower cooling chamber 11, a U-shaped heating pipe 32 extends transversely through the cooling chamber 11 as shown in FIG. 2. The heating pipe 32 is connected to the pipe 31 and is disposed at a communication portion between the lower cooling chamber 11 and the delivery path 9 so that the liquefied thermal medium passing through the pipe 32 is heated by the high temperature thermal medium.

The operation of the thus constructed vapor reflow type soldering apparatus will be explained.

During the operation, the heater 7 is operated to heat the liquefied thermal medium 14 to boil and vaporize it in the vapor generating tank 4. The thermal medium vapor 15 is raised to an upper portion of the vapor generating tank 4 to fill the tank and parts of the passages 5 and 6. In the embodiment, a fluoric inactive organic agent, for instance, "FLUORINERT FC-70" (Tradename, Sumitomo 3M company), is used as the thermal medium. A boiling point of this agent is about 215° C. However, it is apparent that any other suitable agents may be used.

On the other hand, the article 18 to be processed is delivered along the delivery path 19, and after it has been preheated at about 130° to 150° C. in the preheating chamber 2, the article or part is delivered to the reflow chamber 1. The article 18 to be processed is subjected to applications of paste soldering or brazing material, and electronic parts to be soldered and the like are carried on the article in a predetermined position. In the reflow chamber 1, the article 18 is heated in contact with the thermal medium saturated vapor kept at a temperature of about 215° to 220° C., to thereby melt the soldering material and perform the soldering work. Subsequently, the article 18 is moved to the outlet side passage 6 to be gradually cooled and is further cooled in the cooling chamber 3 to be discharged from the apparatus.

After the thermal medium vapor 15 has heated the article 18, a part of the thermal medium vapor is condensed and liquefied to fall downwardly, and is returned back to the bottom of the vapor generating chamber 4. The thermal medium vapor 15 that has been introduced into the passages 5 and 6 are cooled to be liquefied by the inlet side cooling coils 8 and 10a and the outlet side cooling coils 9 and 11a. The thermal medium stagnant within the lower cooling chambers 10 and 11 are returned through the pipes 10b and 11b back to the vapor generating tank 4.

The rest of the thermal medium vapor flowing into the passages 5 and 6 past the cooling coils 8 and 9 is introduced through the discharge ports 12 and 13 into the collecting means 25. In the collecting means 25, the vapor is cooled to be liquefied by the cooling coil 26, and the thermal medium contained in air to be discharged from the outside of the collecting means 25 is entrapped to be collected by the demister 27. The water and/or acid of the thermal medium 28 stagnant within the collecting means 25 are removed by the water/acid remover 29. The thermal medium is introduced into the outlet side cooling chamber 11 through the pump 30 and the pipe 31.

The temperature of the liquefied thermal medium passing through the thermal medium collecting system is reduced substantially to a room temperature, but the liquefied thermal medium is subjected to a heat exchange with the high temperature thermal medium vapor around the heating pipe 32 when the liquefied thermal medium passes through the heating pipe 32. Thus, the liquefied thermal medium is preheated to approximately 150° to 160° C. by its condensation latent heat. The preheated liquefied thermal medium is admixed with the high temperature liquefied thermal medium stagnant within the lower cooling chamber 11, and is returned back to the vapor generating tank 4 through the pipe 11b. It should also be noted that it is possible to adjust the preheating temperature of the liquefied thermal medium by changing shapes and lengths of the heating pipe 32. Since the low temperature liquefied thermal medium is thus preheated and returned back, there is no fear that the thermal medium temperature within the vapor generating tank 4 would be largely decreased. As a result, it is possible to keep a sufficient amount of vapor needed for the soldering treatment and to keep a good working performance.

Figure 3:
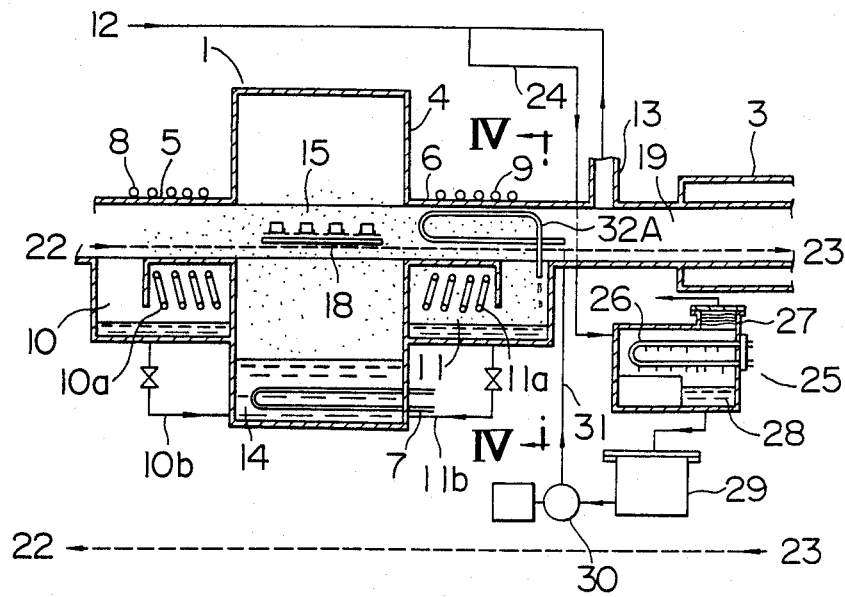
FIG. 3 is a cross-sectional view showing a primary part of a second embodiment.
Figure 4:
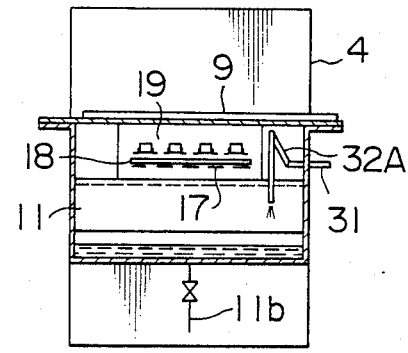
FIG. 4 is a cross-sectional view taken along the line IV—IV of FIG. 3.

A second embodiment of the present invention will now be described with reference to FIGS. 3 and 4. In the following description, the same reference numerals or characters are used to designate the same or like components or members as in the foregoing embodiment, and hence, the duplication in explanation will be omitted.

In the vapor reflow type soldering apparatus in accordance with the second embodiment, a heating pipe 32A is disposed at a position in the outlet side passage 6 in the vicinity of the lower cooling chamber 11. The heating pipe 32A has a U-shape and extends along one wall of the passage 6. A pipe 31 of the thermal medium collecting system is connected to one end of the heating pipe 32A the other end of which is adapted to project into the lower cooling chamber 11. The other structure of the second embodiment is the same as that of the first embodiment. In the second embodiment, the low temperature thermal medium to be returned back to the vapor generating chamber is heated by the high temperature vapor within the passage 6 when the low temperature medium passes through the heating pipe 32A, thus ensuring the same effects and advantages as in the first embodiment.

Figure 5:
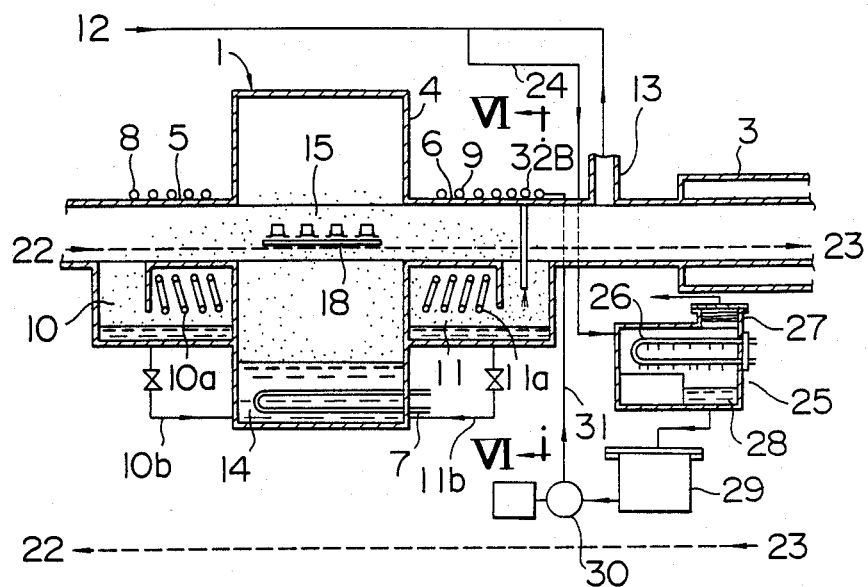
FIG. 5 is a cross-sectional, side elevational view showing a primary part of a third embodiment.
Figure 6:
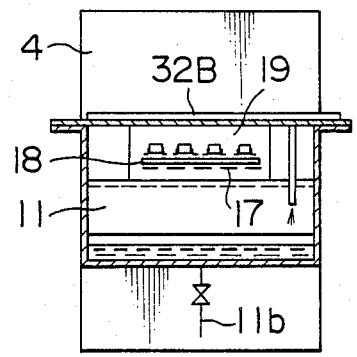
FIG. 6 is a cross-sectional view taken along the line VI—VI of FIG. 5.

FIGS. 5 and 6 show a vapor reflow type soldering apparatus in accordance with a third embodiment of the invention. Also, in the third embodiment, the soldering apparatus other than the heating pipe 32B is constructed in the same manner as in the first embodiment. The heating pipe 32B is provided on an upper portion of the outlet side passage 6 and is arranged downstream of the upper cooling coil 9 in parallel with the latter so as to perform a heat exchange with a high temperature vapor passing through the passage 6. One end of the heating pipe 32B extends into the lower cooling chamber 11 so as to admix the preheated liquefied thermal medium with the high temperature thermal medium. Also the soldering apparatus in accordance with the third embodiment will operate in the same manner as in the first embodiment. It should also be noted that it is possible to use the heating pipe 32B as an upper cooling coil instead of the cooling pipe 9.

Figure 7:
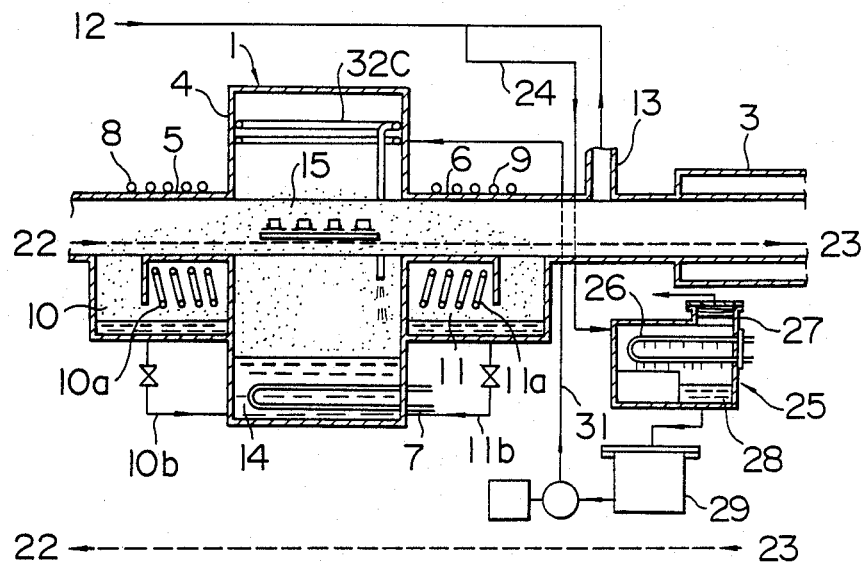
FIG. 7 is a cross-sectional view showing a primary part of a fourth embodiment.

In a fourth embodiment of the invention shown in FIG. 7, a heating pipe 32C is disposed within the vapor generating tank 4. The heating pipe 32C is in the form of a spiral shape extending along the upper wall of the tank 4 and is so constructed as to perform a heat exchange with the high temperature vapor within the tank 4. The other structure of the fourth embodiment is the same as that of the first embodiment, and the soldering apparatus of the fourth embodiment will operate to obtain substantially the same functions and effects.

Figure 8:
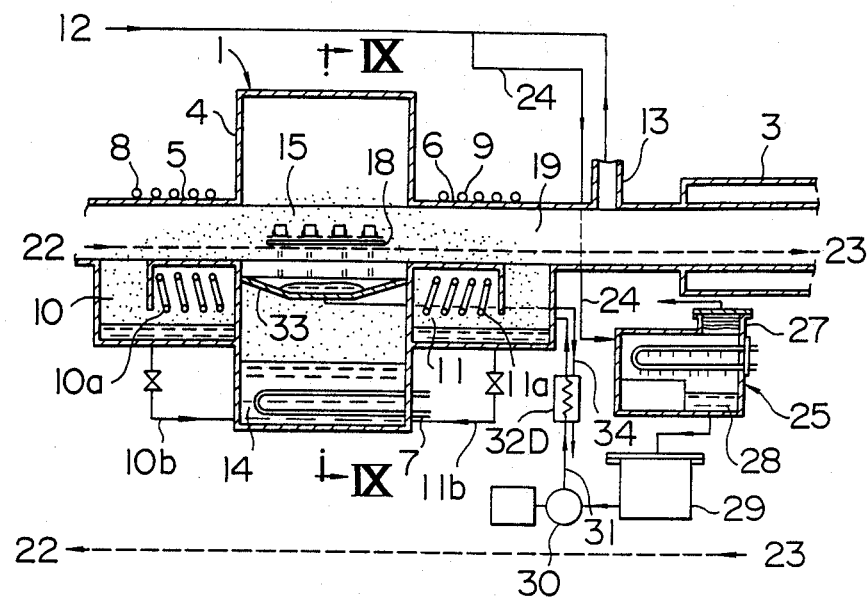
FIG. 8 is a cross-sectional view showing a primary part of a fifth embodiment.
Figure 9:
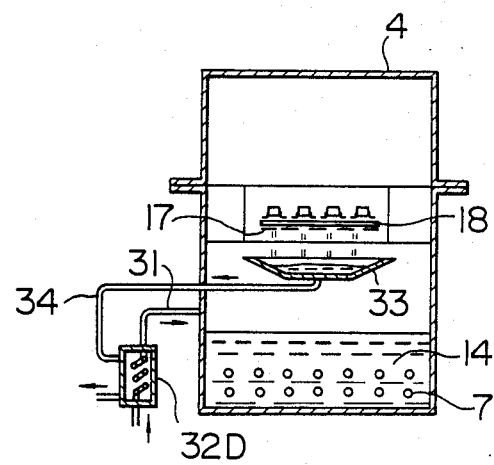
FIG. 9 is a cross-sectional view taken along the line IX—IX of FIG. 8.

FIGS. 8 and 9 show a vapor reflow type soldering apparatus in accordance with a fifth embodiment of the invention. In the apparatus of the fifth embodiment, the high temperature, condensed thermal medium within the vapor generating tank 4 is used to preheat the low temperature, liquefied thermal medium of the thermal medium collecting system. In order to collect the high temperature, condensed thermal medium, a tray member 33 is mounted beneath the delivery path 19 within the vapor generating tank 4. On the other hand, the pipe 31 of the thermal medium collecting system is connected to the outlet side lower cooling chamber 11 and has in its midway a heat exchanger 32D. The tray member 33 is connected through a pipe 34 to the heat exchanger 32D, and is further in communication with the vapor generating tank 4 through a filtering means (not shown).

In operation of the soldering apparatus, the saturated vapor 15 that has been used to heat the article 18 within the vapor generating tank 4 is condensed and liquefied to drop toward the tray member 33 together with flux. The high temperature thermal medium collected in the tray member 33 is allowed to flow into the heat exchanger 32D to heat the low temperature thermal medium flowing through the pipe 31. The thermal medium is subsequently introduced into the filtering means, and after mixtures such as flux and the like have been removed therefrom, the thermal medium is returned back to the vapor generating tank 4. Thus the low temperature thermal medium liquefied through the thermal medium collecting system is preheated, further mixed with the high temperature thermal medium within the lower cooling chamber 11, and returned back to the vapor generating tank 4. The construction and the operation of the soldering apparatus of the fifth embodiment are the same as those of the first embodiment.

Figure 10:
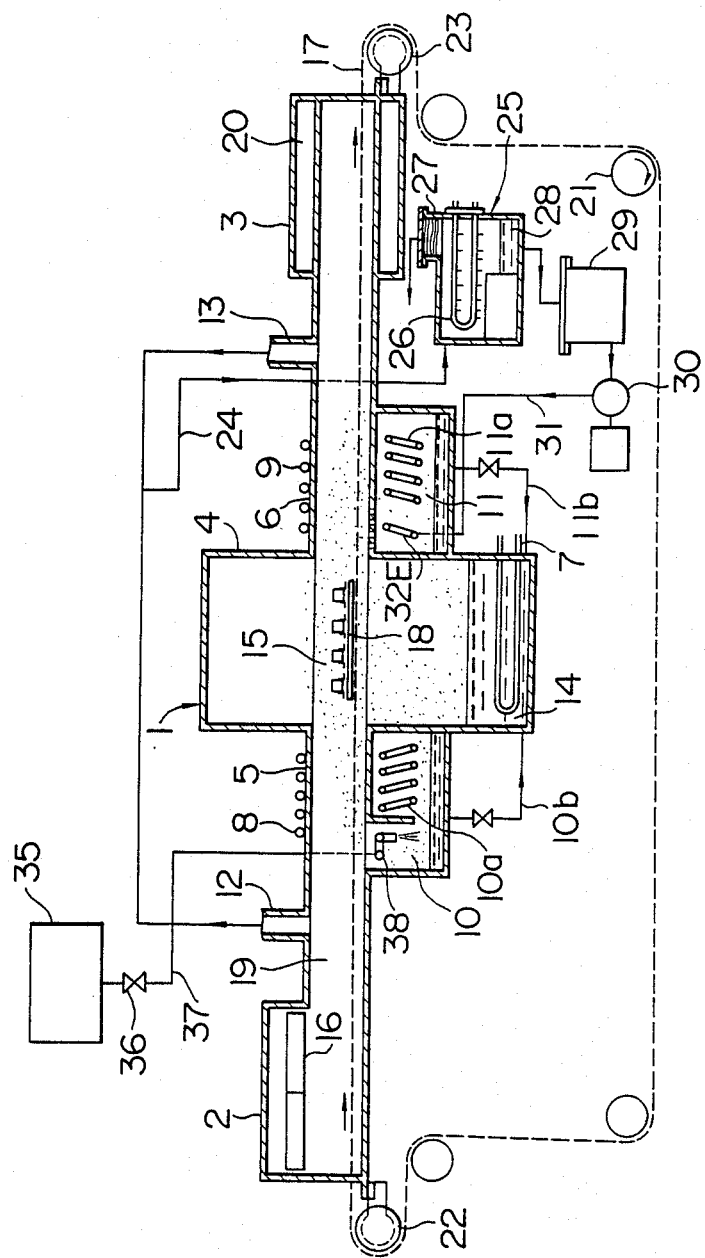
FIG. 10 is a cross-sectional, side elevational view showing an overall structure of a sixth embodiment.

In a sixth embodiment of the invention shown in FIG. 10, a heating pipe 32E is disposed between a side wall of the vapor generating tank 4 and the cooling coil 11a within the outlet side lower cooling chamber 11. The heating pipe 32E is in the form of a U-shape extending transversely through the cooling chamber 11. A partition wall is provided between the passage 6 and the lower cooling chamber 11. A number of small diameter through pipes through which the thermal medium is allowed to pass are formed in the partition wall. The heating pipe 32E is held in contact with the high temperature thermal medium that has passed through the through pipes, and the liquefied thermal medium of the thermal medium collecting system is preheated when it flows through the heating pipe 32E. Partitioning members between the respective passages and the associated lower cooling chambers are provided substantially in the form of a roof about the vapor generating tank 4 within the delivery path 19 so as to be suitable for the soldering process, but these partitioning members may be dispensed with if the soldering condition is met.

In the vapor reflow type soldering apparatus in accordance with the sixth embodiment, there is further provided a liquid supply tank 35 for replenishing the thermal medium for compensating for the reduction due to overflow or leakage during the operation of the apparatus. The liquefied thermal medium for replenishment is received in the liquid supply tank 35 which is in communication with the inlet side lower cooling chamber 10 through an opening/closing valve 36 and a pipe 37. Within the lower cooling chamber 10 at a communication portion with the delivery path 19, there is provided a heating pipe 38 having substantially the same shape as that of the heating pipe 32 of the first embodiment. The pipe 37 is connected to one end of the heating pipe 38, so that the liquefied thermal medium in the liquid supply tank 35 is introduced into the lower cooling chamber 10 through the heating pipe 38.

During the operation of the soldering apparatus, the level of the liquefied thermal medium 14 in the vapor generating tank 4 is gradually lowered due to the overflow from opening portions of the apparatus, adhesion to the substrate to be processed, stagnation in respective components and the like. When the liquid level of the vapor generating chamber 4 is lower than a predetermined level, a level switch (not shown) mounted in the tank 4 is operated to open the opening/closing valve 36. As a result, the liquefied thermal medium flows through the pipe 37 from the liquid supply tank 35 and is preheated from a room temperature to a temperature of about 150° to 160° C. through heat exchange with the high temperature thermal medium vapor around the heating pipe 38. Thereafter, the liquefied thermal medium is mixed into the high temperature, liquefied thermal medium in the lower cooling chamber 10. The liquefied thermal medium in the lower cooling chamber 10 is introduced into the vapor generating tank 4 through the pipe 10b. When the liquid level of the thermal medium in the vapor generating tank 4 is returned back to the predetermined level by the replenishment, the above-described level switch is inoperative, to close the opening/closing valve 36 and stop the replenishment of the thermal medium.

As described above, in the sixth embodiment, since the liquefied thermal medium not only from the thermal medium collecting system but also the replenishment system is heated and introduced through the heat exchange with the high temperature thermal medium, the temperature drop of the thermal medium within the vapor generating tank is suppressed, thus saving an energy needed for heating. The structure and the operation of the soldering apparatus in accordance with the sixth embodiment are the same as those of the first embodiment.

Next, a vapor reflow type soldering apparatus provided with a liquid supply tank in accordance with other embodiments of the invention will now be described with reference to FIGS. 11 through 19. In the following embodiment, reference will be made only to the liquid supply tank systems but it is apparent to use these supply tank systems in combination with the apparatus of the first to sixth embodiments.

Figure 11:
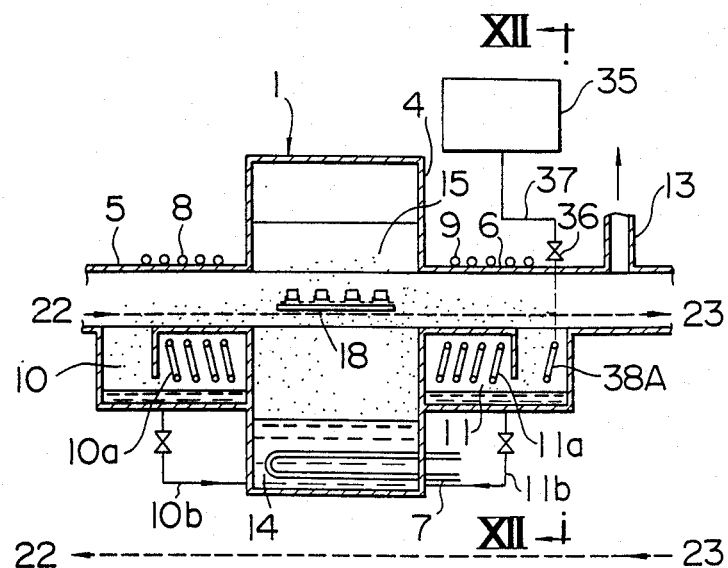
FIG. 11 is a cross-sectional, side elevational view showing a primary part of a seventh embodiment.
Figure 12:
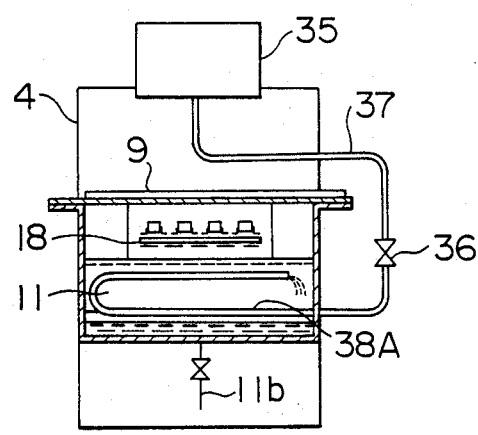
FIG. 12 is a cross-sectional view taken along the line XII—XII of FIG. 11.

In a sixth embodiment shown in FIGS. 11 and 12, a liquid supply tank 35 is in communication with a heating pipe 38A disposed within the outlet side lower cooling chamber 11 through an opening/closing valve 36 and a pipe 37. The heating pipe 38A is in the form of a U-shape as in the heating pipe 32E of the sixth embodiment, and extends in a direction across the communication portion between the cooling chamber 11 and the passage 6 as shown in FIG. 12. The heating pipe 38A is held in contact with the high temperature thermal medium vapor to preheat the liquefied thermal medium flowing through the heating pipe 38A.

Figure 13:
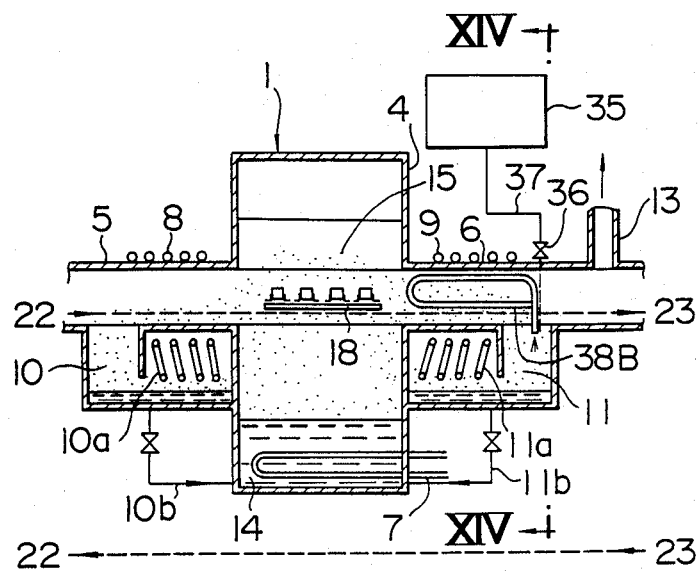
FIG. 13 is a cross-sectional, side elevational view showing a primary part of an eighth embodiment.
Figure 14:
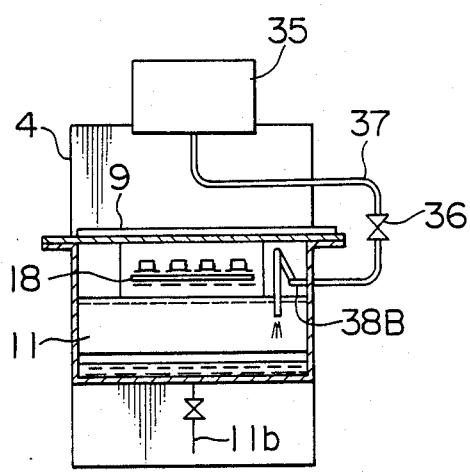
FIG. 14 is a cross-sectional view taken along the line XIV—XIV of FIG. 13.

In an eighth embodiment shown in FIGS. 13 and 14, the substantially U-shaped heating pipe 38B is disposed along one side wall within the passage 6 in the same manner as in the heating pipe 32A of the second embodiment. The heating pipe 38B has substantially the same function as that of the pipe 32A of the second embodiment.

Figure 15:
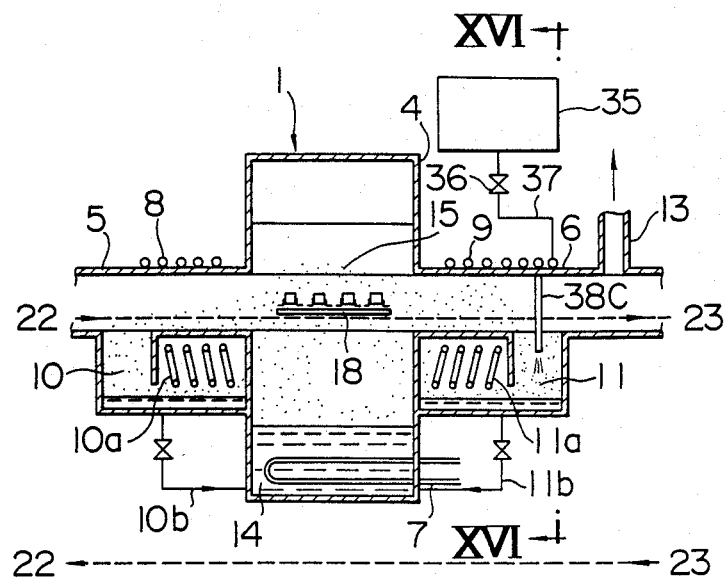
FIG. 15 is a cross-sectional, side elevational view showing a primary part of a ninth embodiment.
Figure 16:
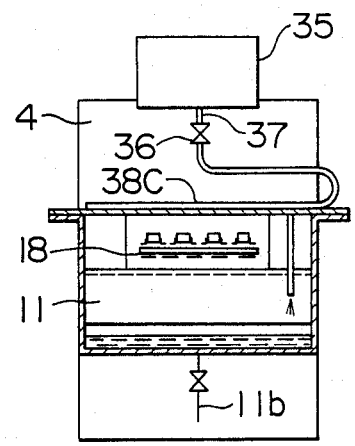
FIG. 16 is a cross-sectional view taken along the line XVI—XVI of FIG. 15.

FIGS. 15 and 16 show a soldering apparatus in accordance with ninth embodiment of the invention. In this embodiment, the heating pipe 38C is arranged on an upper portion of the outlet side passage 6 in the same manner as in the heating pipe 32B of the third embodiment. The heating pipe 38C has substantially the same function as that of the pipe 32B of the third embodiment.

Figure 17:
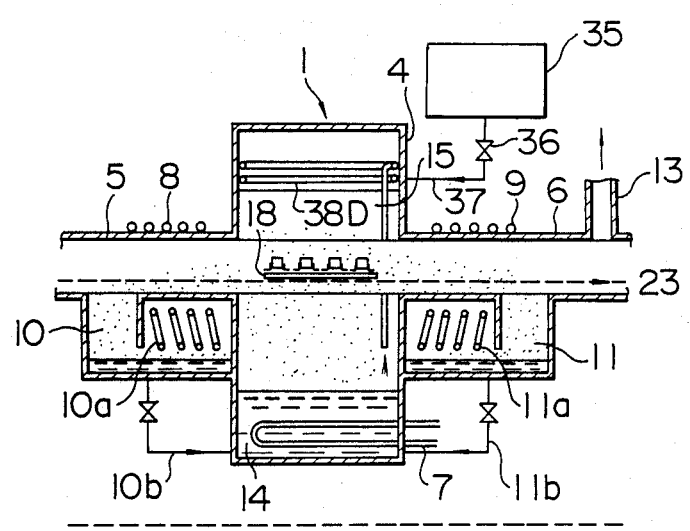
FIG. 17 is a cross-sectional, side elevational view showing a primary part of tenth embodiment.

In a tenth embodiment shown in FIG. 17, a heating pipe 38D is provided along the upper inner wall within the vapor generating tank 4 in the same manner as in the heating pipe 32C of the fourth embodiment. The heating pipe 38D has substantially the same function as in the pipe 32C of the fourth embodiment.

Figure 18:
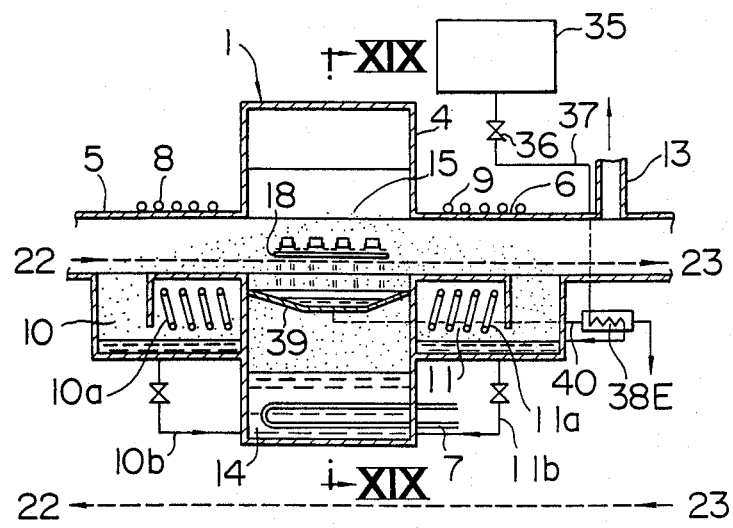
FIG. 18 is a cross-sectional, side elevational view showing a primary part of an eleventh embodiment.
Figure 19:
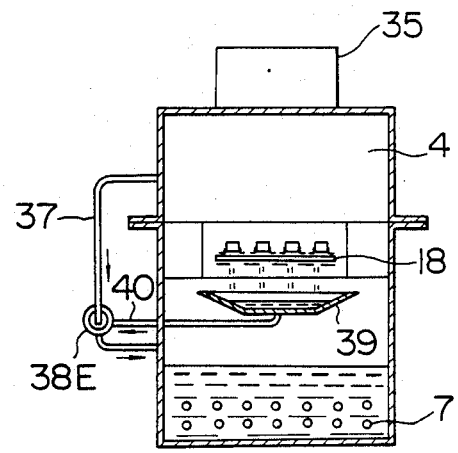
FIG. 19 is a cross-sectional view taken along the line XIX—XIX of FIG. 18.

FIGS. 18 and 19 show a vapor reflow type soldering apparatus in accordance with an eleventh embodiment of the invention. In this embodiment, the high temperature thermal medium condensed within the vapor generating tank 4 is used to preheat the liquefied thermal medium of the liquid supply tank 35 in the same manner as in the fifth embodiment. As in the fifth embodiment, a tray member 39 is provided within the vapor generating chamber 4. The tray member 39 is in communication with a heat exchanger 38E interposed in a pipe 37 of the liquid supply tank, through a pipe 40. The high temperature thermal medium that has passed through the pipe 40 is used to heat the liquefied thermal medium fed from the liquid supply tank 35, and thereafter is returned back to the vapor generating tank 4 through a filtering means (not shown). The other structure and the operation of the soldering apparatus in accordance with the eleventh embodiment are substantially the same as those of the fifth embodiment.

The following advantages or effects may be ensured in accordance with the present invention:

1. Since the liquefied thermal medium is preheated and introduced into the vapor generating tank, a temperature drop of the thermal medium within the vapor generating tank may be suppressed. For this reason, faults in soldering treatment due to the insufficient vapor amount are suppressed, and it is possible to keep the working property in a good condition.

For instance, in case of the thermal medium used in the foregoing embodiment, a sensible heat needed for elevating the thermal medium from its room temperature of 30° C. to a temperature of 215° C. is 2.8 times as high as its latent heat. Therefore, assuming that the amount of the thermal medium collected by the thermal medium collecting system be 5 to 10% of the thermal medium contained in the vapor generating tank, in the case where the liquefied thermal medium kept substantially at room temperature is introduced from the thermal medium collecting system into the vapor generating tank without any preheat, the amount of the generated vapor is reduced by 14 to 28% due to the temperature drop. In such a soldering apparatus, in general, the vapor generating amount is set with an excess of about 10 to 20% with respect to the amount needed for the soldering process, but under the above-described condition, the amount of vapor will be insufficient. According to the present invention, the reduction in amount of vapor generated during the introduction of the preheated thermal medium is about 5 to 10%, and the amount of vapor needed for soldering process is hardly deficient.

Also, the amount of the thermal medium replenished from the liquid supply tank depends upon the liquid level detecting method but generally falls within a range of 10 to 20% of the thermal medium within the vapor generating tank. Accordingly, if the thermal medium kept at room temperature would be replenished without any preheat, the amount of the generated vapor would be reduced by 28 to 56% under the above-described condition. According to the invention, since the reduction in generated vapor amount during the replenishment of the preheated thermal medium is about 10 to 20%, faults in soldering treatment due to the insufficient vapor amount may be essentially eliminated.

2. The preheating means may be satisfactorily formed of a simple pipe or the like, so that a cost increase of the overall apparatus may be very small. On the other hand, since a large capacity heater for compensating for a lack of the vapor amount may be dispensed with, it is possible to decrease a production cost of the apparatus.

Also, an additional heater for compensating for the reduction in the generated vapor may be dispensed with unlike the conventional soldering apparatus. Furthermore, the fluid resistance of the liquefied thermal medium introduced is considerably reduced; that is, in case of the thermal medium used in the foregoing embodiment, the viscosity at a liquid temperature of 200° C. is about one twentieth of the viscosity at a liquid temperature of 30° C. Accordingly, the flow rate of the thermal medium during the collection and replenishment is increased. For this reason, it is possible to reduce the amount of the expensive thermal medium that should be stored in the apparatus for keeping a sufficient liquid level, and it is also possible to reduce the running cost of the apparatus.

3. According to the present invention, the heat exchanger is located where the thermal medium vapor is inherently to be cooled or liquefied. Therefore, the coolant may be saved corresponding to the heat quantity that heats the introduced, liquefied thermal medium, and the economic advantage of the apparatus is further ensured.

The present invention has been fully explained in accordance with the specific embodiments. It is apparent that the invention is not limited thereto or thereby but various modifications or changes are possible within the scope of the appended claims.

What is claimed is:

1. A vapor reflow type soldering apparatus comprising:
    a tank for receiving therein liquefied thermal medium, said tank having a delivery path extending through said tank;
    heater means for heating the thermal medium in said tank, so as to provide high temperature thermal medium, thereby causing thermal medium vapor to reach said delivery path;
    conveyor means for delivering an article or part to be processed through said delivery path so that soldering material of said article is heated and molten for a soldering process;
    coolers provided on lower side of said delivery path at inlet and outlet sides of said delivery path for condensing and liquefying the thermal medium vapor flowing through said delivery path;
    thermal medium collecting means for collecting and condensing the thermal medium vapor and for returning liquefied thermal medium back to the tank, said thermal medium collecting means being connected at at least one of said inlet and outlet sides of said delivery path to said delivery path in order to entrap the thermal medium vapor flowing through said delivery path, said thermal medium collecting means including a cooler and a water/acid remover; and
    heat exchanger means interposed between said tank and said thermal medium collecting means for heat-exchange between the liquefied thermal medium and high temperature thermal medium, thereby preheating the liquefied thermal medium and introducing the liquefied thermal medium into said tank.

2. The apparatus according to claim 1, wherein said heat in order to entrap the thermal medium vapor flowing through said delivery path, said thermal medium collecting means includes a cooler and a water/acid remover, and said heat exchanger means includes a passage that is arranged in at least partial contact with the high temperature thermal medium, the liquefied thermal medium being delivered through said passage from said water/acid remover to said tank.

3. The apparatus according to claim 1, wherein said heat exchanger means including a passage that is arranged in one of the lower coolers in at least partial contact with the thermal medium vapor, the liquefied thermal medium being delivered through said passage from said thermal medium collecting means to said tank.

4. The apparatus according to claim 3, wherein each of coolers is provided with a cooling coil through which a coolant passes, and said passage is arranged closer to said tank than the cooling coil of the lower cooler.

5. The apparatus according to claim 1, wherein said heat exchanger means includes a passage that is arranged within said delivered path in at least partial contact with the thermal medium vapor, the liquefied thermal medium being delivered from said thermal medium collecting means to said tank.

6. The apparatus according to claim 1, wherein said heat exchanger means includes a passage for delivering the liquefied thermal medium from said thermal medium collecting means to said tank, said passage being at least partially arranged on an upper side of said delivery path along said delivery path for cooling the thermal medium vapor flowing through the delivery path with the liquefied thermal medium, thereby heating said liquefied thermal medium.

7. The apparatus according to claim 1, wherein said heat exchanger means includes a passage at least part of which is arranged in the tank above said delivery path, for delivering the liquefied thermal medium from said thermal medium collecting means to the tank.

8. The apparatus according to claim 1, wherein said heat exchanger means includes a tray member provided within the tank below said delivery path for receiving therein the dropping, high temperature liquefied thermal medium, and a heat exchanger connected to a passage for delivering the liquefied thermal medium from the thermal medium collecting means to the tank, said heat exchanger being connected to said tray member for introducing the high temperature liquefied thermal medium as a heat source.

9. The apparatus according to claim 1, further comprising means for replenishing the liquefied thermal medium to the tank, opening/closing valve means interposed between a passage connecting said replenishing means and said tank, and second heat exchanger means for preheating the thermal medium to be replenished through heat exchange with the high temperature thermal medium, said second heat exchanger means being provided between said tank and said opening/closing value means.

10. The apparatus according to claim 9, wherein said second heat exchanger means including a passage that is arranged in one of the lower coolers in at least partial contact with the thermal medium vapor, the liquefied thermal medium being delivered through said passage from said replenishing means to said tank.

11. The apparatus according to claim 9, wherein said second heat exchanger means include a passage that is arranged within said delivery path in at least partial contact with the thermal medium vapor, the replenishment thermal medium being delivered from said replenishing means to said tank.

12. The apparatus according to claim 9, wherein said second heat exchanger means includes a passage for delivering the replenishment thermal medium from said replenish means to said tank, said passage being at least partially arranged on upper side of said delivery path along said delivery path for cooling the thermal medium vapor flowing through the delivery path with the replenishment thermal medium, thereby heating said replenishment thermal medium.

13. The apparatus according to claim 9, wherein said second heat exchanger means includes a passage at least part of which is arranged in the tank above the delivery path, for delivering the replenishment thermal medium from said replenishing means to the tank.

14. The apparatus according to claim 9, wherein said second heat exchanger means includes a tray member provided within the tank below said delivery path for receiving therein the dropping, high temperature liquefied thermal medium, and an heat exchanger connected to a passage for delivering the replenishment thermal medium from the replenishing means to the tank, said heat exchanger being connected to said tray member for introducing the high temperature liquefied thermal medium as a heat source.

15. The apparatus according to claim 1, wherein said thermal medium collecting means is connected at both the inlet and outlet sides of said delivery path to said delivery path.

16. The apparatus according to claim 1, wherein said thermal medium collecting means is located outside of said tank.

17. A vapor reflow type soldering apparatus comprising:
a vapor generating tank having a bottom portion for receiving liquefied thermal medium and a delivery path above the bottom portion through said vapor generating tank;
heater means for heating the thermal medium in said vapor generating tank, thereby causing thermal medium vapor to reach said delivery path, said heater means being provided in the bottom portion of said tank;
a preheating chamber provided at an inlet of said delivery path, said preheating chamber being provided with means for preheating an article or part to be processed;
conveyor means for delivering the article through said delivery path so that soldering material of said article is heated and molten for a soldering process;
a cooling chamber provided at an outlet of said delivery path, said cooling chamber being provided means for cooling the article;
coolers provided above and below said delivery path between said preheating chamber and said vapor generating tank and between said vapor generating tank and the cooling chamber for condensing and liquefying the thermal medium vapor flowing through said delivery path;
thermal medium collecting means for collecting and condensing the thermal medium vapor and returning the liquefied thermal medium back to said vapor generating tank, said thermal medium collecting means being connected to said delivery path between the preheating chamber and the inlet side cooler and between the outlet side cooler and the cooling chamber for entrapping the rest of the thermal medium vapor that has passed through said coolers; and
preheating means for preheating the liquefied thermal medium to be introduced into said vapor generating tank with the high temperature thermal medium, said preheating means being arranged within the outlet side lower cooler in order to be in at least partial contact with the thermal medium vapor for heat-exchange, said preheating means including a passage for delivering the liquefied thermal medium from a water/acid remover to said vapor generating tank.

18. The apparatus according to claim 17, further comprising liquid supply tank means for receiving the liquefied thermal medium to be replenished to said vapor generating tank, valve means for selectively opening/closing a passage between said liquid supply tank means and said vapor generating tank, and preheating means for causing heat-exchange between the replenishment thermal medium and the high temperature thermal medium.

19. The apparatus according to claim 18, wherein said means for preheating the replenishment thermal medium comprises a passage arranged so as to contact with the high temperature thermal medium for heat-exchange for delivering the replenishment thermal medium.

20. A vapor reflow type soldering apparatus comprising:
 a tank for receiving therein liquefied thermal medium, said tank having a delivery path extending through said tank;
 heater means for heating the thermal medium in said tank, so as to provide high temperature thermal medium, thereby causing thermal medium vapor to reach said delivery path;
 conveyor means for delivering an article or part to be processed through said delivery path so that soldering material of said article is heated and molten for a soldering process;
 coolers provided on a lower side of said delivery path at inlet and outlet sides of said delivery path for condensing and liquefying the thermal medium vapor flowing through said delivery path;
 means for replenishing the liquefied thermal medium to the tank;
 opening/closing valve means interposed between a passage connecting said replenishing means and said tank; and
 heat exchanger means for preheating the thermal medium to be replenished through heat exchange with high temperature thermal medium, the heat exchanger means being provided between said tank and said opening/closing valve means.

* * * * *